United States Patent

[11] 3,541,979

| | | | | |
|---|---|---|---|---|
| [72] | Inventor | Coby Lorenzen Davis, California | | |
| [21] | Appl. No. | 766,441 | | |
| [22] | Filed | Oct. 10, 1968 | | |
| [45] | Patented | Nov. 24, 1970 | | |
| [73] | Assignee | The Regents of the University of California | | |

[54] ROW CROP PRODUCTION AND HARVESTING
27 Claims, 30 Drawing Figs.

[52] U.S. Cl. .................................................. 111/2,
171/28, 171/1; 56/1, 56/327; 47/2; 61/72.6
[51] Int. Cl. ............................................... A01c 11/00
[50] Field of Search.......................................... 171/1, 21,
27, 28, 50, 51, 53, 62; 56/1, 327; 111/2, 3; 47/56,
58; 61/72.6

[56] References Cited
UNITED STATES PATENTS
| | | | | |
|---|---|---|---|---|
| 2,338,103 | 1/1944 | Fischer.............................. | | 47/56 |
| 2,916,854 | 12/1959 | Heigl et al. ..................... | | 47/58 |
| 2,980,041 | 4/1961 | Nielsen............................ | | 111/3 |
| 3,020,859 | 2/1962 | Kang................................ | | 111/3 |

*Primary Examiner*—A. F. Guida
*Attorney*—Owen, Wickersham and Erickson

ABSTRACT: A production method for row crops and a row crop harvester. A line having a series of spaced-apart slipknots is placed below ground, and plants are grown in a row so that the stems extend through said slipknots and branch above them, with the roots branching below the knot, until the fruit on the plants is ready for harvest. Then the roots are severed below the slipknots, and the line is pulled from the ground so as to tighten each said slipknot and to carry up the plants with the line, thereby orienting the plants by means of the pulled-up line. A force (twisting, plucking, or shaking) is then exerted on the fruit tending toward and resulting in separation of the fruit from the plants, and the separated fruit is collected while the plants are disposed of.

Patented Nov. 24, 1970

FIG_1

FIG_2

INVENTOR.
COBY LORENZEN
BY
Owen, Wickersham & Erickson
ATTORNEYS

FIG_3

FIG_7

FIG_8

INVENTOR.
COBY LORENZEN

BY Owen, Wickersham & Erickson

ATTORNEYS

FIG_4

FIG_5

FIG_6

INVENTOR.
COBY LORENZEN

FIG_9

FIG_10

FIG_11

FIG_12

FIG_13

INVENTOR.
COBY LORENZEN
BY
Owen, Wickersham & Erickson
ATTORNEYS

FIG_14

FIG_15  FIG_16  FIG_17

INVENTOR.
COBY LORENZEN

FIG_25

FIG_26

FIG_27

FIG_28

FIG_30

FIG_29

INVENTOR.
COBY LORENZEN

BY
Owen, Wickersham & Erickson
ATTORNEYS

ROW CROP PRODUCTION AND HARVESTING

This invention relates to improvements in method and apparatus for tomato production, including the growing and harvesting of tomatoes. It also relates generally to other row crops.

Tomato production for canning has reached an advanced stage of mechanization with more than a thousand harvesters handling the major portion of the California crop. Economically practical harvest operations employing mechanical systems have, in their turn, been made economically feasible by the breeding of new varieties of tomatoes, and progress continues to be made.

Even so, several apparent limitations affecting product quality seem to be incapable of solution merely by development and refinement of the present systems. Chief among these limitations have been the mechanical damage to the tomatoes and the incorporation of dirt with the harvested crop. The present invention has as one of its main objects the reduction of both of these factors.

All current mechanical tomato harvesters unavoidably pick up considerable amounts of dirt; some harvesters do so purposefully, but that does not mean that they do not thereby introduce a severe problem; other harvesters endeavor to reduce dirt to a minimum but are unable to eliminate dirt completely because of inherent factors of their pickup assembly.

All current mechanical tomato harvesters achieve separation of the fruit from the vine by imparting energy to the fruit or vine, so that the inertia of the fruit effects removal. Performance of this type of system is essentially independent of the orientation of the vine with respect to the separator components. The tomato vines are cut off underground, are lifted mechanically from the ground along with some or much dirt, and then the vines are shaken. Since the orientation of the vine is of small consequence in such systems, no attempt is made to control it. The energy imparted to the shaker is transferred to the fruit or vine, and the inertia of the fruit effects removal. Shaking inevitably results in some fruit damage due to this impartation of energy, as the fruit strikes other fruit or parts of the shaking apparatus.

The present invention achieves pickup of the vines in a novel manner that substantially eliminates the pickup of dirt. Moreover, its separation system imparts a minimum of energy to the fruit, not relying on shaking as the primary means of achieving separation but instead employing the energy of separation to twist off or pluck the fruit from the vine while retaining strict orientation of the vine during separation.

Heretofore, tomato production has remained largely unchanged except for harvesting. In contrast to these prior methods, the present invention coordinates the planting of tomatoes with the harvesting step to enable control of the orientation of the vines in the harvesting step. The tomato seeds are planted in such a manner as to insure that all the tomato vines in each row are connected together by a line of string or small rope located below ground between the root crown and the lowest branches of the tomato plant. During harvesting the roots are severed at a convenient distance below the root crown and then the tomato plant is pulled from the ground by elevation of the line, which is tied around its main stem, and this line is used to maintain control of the orientation of the plant while it is in the harvest recovery unit.

Several recovery methods are employed, all in essentially a stripping type of action: some methods act by twisting the fruit off its stems, the twisting being done by such means as flexible strips or soft rollers; in other methods the fruit is pulled from the stems, as by raking or by rotary combing; in some methods there is a combination of pull and fatigue as by vibrating the rakes or combs; and in some a shaking action is added in combination with staggered rollers.

In this invention, very little, if any energy is imparted to the fruit or vine, since the fruit is taken off by a kind of stripping action. The energy imparted to the fruit being minimal and being controllable, selective separation on the basis of fruit maturity becomes possible.

Other objects and advantages of the invention will appear from a description of several embodiments thereof.

In this invention, tomatoes are harvested with the aid of a line 30 (see especially FIGS. 3 and 8) which may be made of strong string, twine, small rope, or clothesline, whether of plastic, thread, fibre, or other materials. The line 30 is arranged with a loose slipknot 31 around each stem 32, so that pulling on the line 30 tightens the knot 31 around the stem 32, all the stems 32 of the plants 33 in one row being thereby secured to one line 30. The line 30 thereby enables accurate orientation of the vine during harvesting and enables the harvesting of the tomatoes 34 while imparting only a minimum amount of energy to the fruit 34; this in turn enables accurate recovery with a minimum of damage to the fruit. Also it substantially eliminates the dirt problem, since almost no dirt accompanies the tomato plants 33 into the harvester.

A preferred way of obtaining this line and slipknot 31 arrangement is to place the line 30 and its series of slipknot loops at the time of planting, with each slipknot 31 carrying a tomato seed. The seed is positioned inside the loop 31 so that the plant will sprout and come up through the slipknot 31. There are various ways of accomplishing this, for the seed may be separately planted within the loop by hand or mechanically, or the loop itself may carry a seed-bearing film or holder which enables the sprouting of the seed within the loop. The loop 31 is made larger in diameter than the maximum size of the stem 32 to come, in order not to restrict plant growth, and yet small enough so that when harvesting there is not a great deal of slack taken up when tightening it. If desired, the line 30 may be placed after planting, but this is less convenient.

The tomato plant 32 grows in the normal way unaffected by the line 30. The roots 35 branch down below the knot 31, whereas the plant 32 above the ground branches out above the knot 31, so that the knot 31 is assisted thereby in holding the plant during harvest.

Before harvesting, irrigation is preferably withheld from the plants for a reasonable period. This has a good effect upon the fruit in that it does not overload it with water and reduces its fragility, and it also has an important effect on harvesting, in that the stem 32 tends to shrink and harden, so that it is stronger and is held even tighter by the slipknot 31 when the slipknot 31 is tightened upon it.

During or shortly before harvesting, the major part of the roots 35 are severed, so as to prevent the kind of jerking and other difficulties that would occur if the line 30 had to pull up the entire root system of the tomato plant. The cut line 36 (FIG. 8) is a short distance below the slipknot 31 and is preferably below the branching out of the roots, so that the root crown itself helps to prevent the plant 33 from slipping out through the slipknot 31 as the plant is being harvested. This severing of the roots 35 may take place simultaneously with the harvesting of the plants 32 by a blade 39 as in FIG. 1, or may precede it by some hours or some days. Studies are currently being made as to the effects of simultaneous and nonsimultaneous harvesting in this manner. Thus, although the severing of the roots is an important step in the harvesting, it need not be done by the harvesting machine itself at the time of harvesting. It may be done by the harvesting machine at an earlier time or may be done by a different machine, either immediately before harvesting or a long time before it.

As the line 30 is pulled from the soil, it carries the tomato plants 30 with it; the weight of the tomato plants necessarily results in an inversion, so that the plants hang down from the line 30. This inversion does not place much pull on the plants, and only a small number of overripe tomatoes fall off during or as a result of this inversion or, for that matter, in any phase of the removal of the plants 32 from the ground. Very little dirt is carried away by the small root stub 35, so that substantially cleaner work than could heretofore be done is the rule.

As stated earlier, several different types of harvesting separation are shown, all illustrating the general principle of removal of the fruit from the vine by a type of action which does not require an impartation of great energy to the fruit but which by a twisting or pulling or pendulum action, or, in some cases, twisting or pulling combined with some vibration or shaking removes the fruit by a different action than that employed by conventional harvesters.

Figure 1:
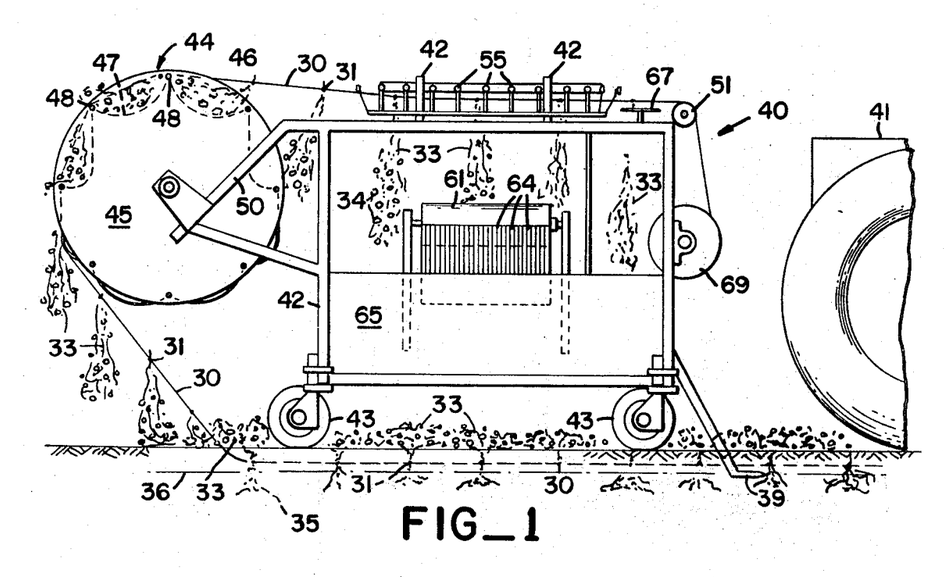
FIG. 1 is a view in side elevation of a portion of a tomato harvester embodying the principles of the present invention. The view is somewhat diagrammatic.
Figure 2:
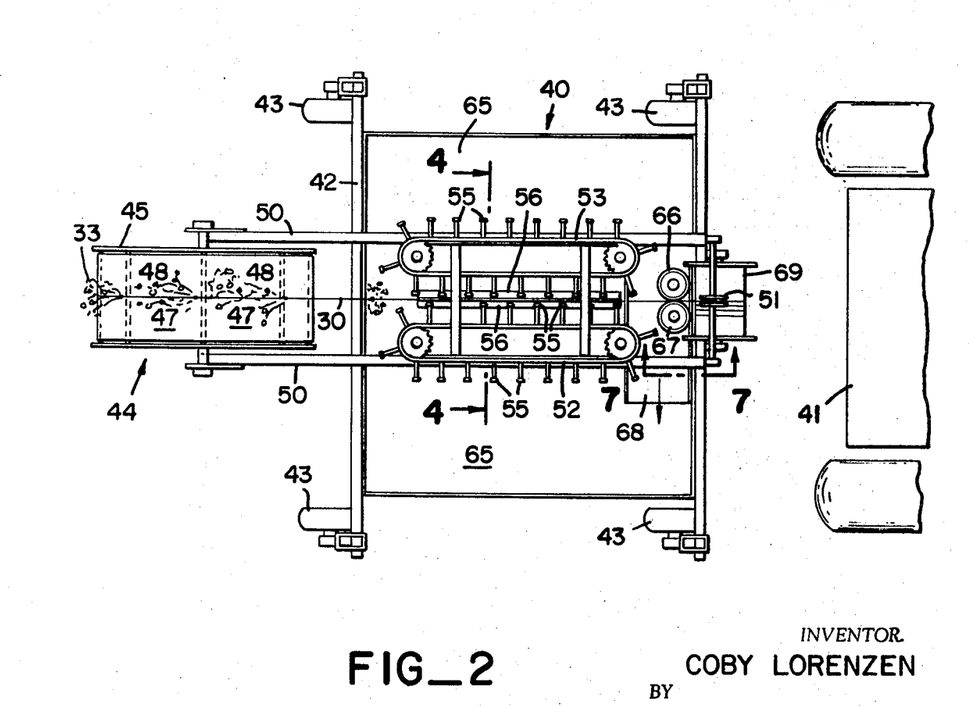
FIG. 2 is a top plan view of the apparatus of FIG. 1.

Thus, the harvester 40 shown, somewhat diagrammatically, in FIGS. 1 through 4 and 7 brings out some important points. The harvester 40 is shown in FIGS. 1 and 2 as drawn by a tractor 41, but it may, of course, be self-powered. In this instance, the underground cutter 39 that cuts along the line 36 in FIG. 8 is shown combined with and supported by the unit 40; in any event, cutters are well known in tomato harvesters. The machine 40 has a main frame 42 supported on wheels 43 that span the row to be harvested. At the rear of the main frame 41 is a drum 44 having a pair of discs 45, between which extend a resilient plant support or carrier 46, intended to accommodate the tomato vines in a series of receptacles 47. The carrier 46 may be loosely supported canvas arranged generally in a circle, the receptacles 47 being provided by slack portions between successive fixed points 48, so that a vine 33 can seat in a receptacle 47 during its path up around the drum 44.

The vines 33 are carried by the line 30, a free end of which is started into the harvester 40 first and which then carries the vines 33 along with it, pulling them from the ground. The spaced intervals between the slipknots 31 may vary and may or may not be such that the vine 33 fits into the receptacles 47. The receptacle size and spacing can be adjusted in size for different spacings or sizes of vines. The drum 40 may be suspended as shown from a pair of frame members 50 so as to rotate freely, as operated by the vines 33 themselves, though separately driven rotation may be employed if that is desired.

The line 30 runs over a pulley 51 near the front portion of the machine 40, and in between the drum 44 and the pulley 51, the vines 33 are partly supported by a pair of conveyor chains 52 and 53 having fingers 54 which project toward each other and form a support for the line 30 from which the vines are suspended. (See FIGS. 3 and 4.) Attached to the chains 52 and 53 is a series of trolley wheels 55 which ride on rails 56, below which are the fingers 54 which support the line 30, reaching in more than half way toward the opposite chain to do this. As the vines 33 are thus carried along upside down, they are positively oriented.

Figures 4, 5, 6:
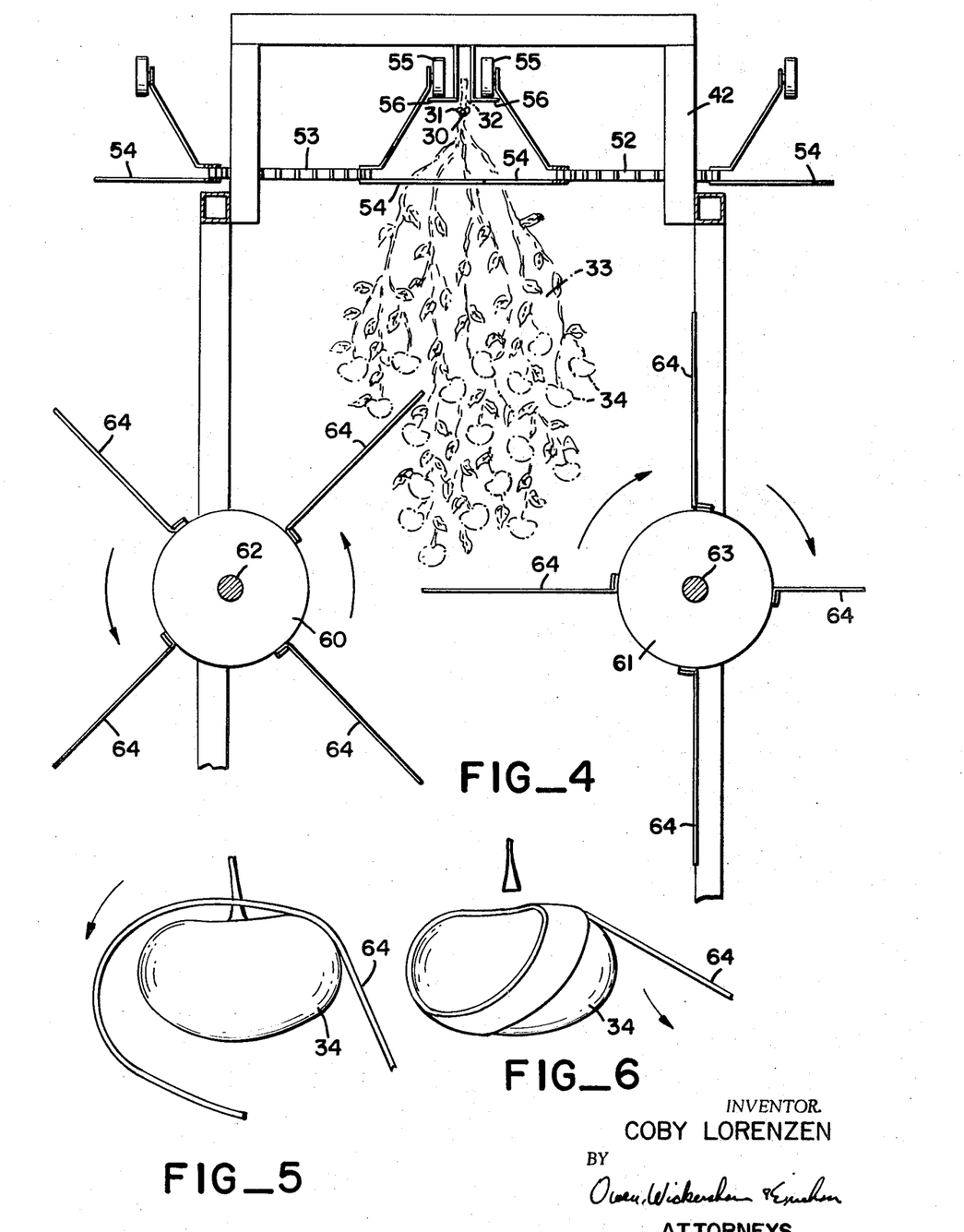
FIG. 4 is an enlarged view in plan taken along the line 4-4 in FIG. 2.
FIG. 5 is a further enlarged fragmentary view in side elevation of one of the straps or fingers of FIG. 4 wrapping around a tomato that is still attached to the vine.
FIG. 6 is a similar view with the strap or finger having wrapped itself around the tomato and produced a twisting action that removed the tomato from the stem.

The actual separation may be done (FIG. 4) by a pair of cylindrical drums 60 and 61 mounted on horizontal parallel shafts 62 and 63 and arranged to rotate in opposite directions so that the top surfaces of the drums 60 and 61 move away from each other. Flexible flat rubber straps or fingers 64 are attached to the surfaces of the drums 60 and 61, preferably in rows parallel to the drum axes 62 and 63. In operation, the rotational speed of the drums 60 and 61 causes the fingers 64 to stand out radially, and the tomato plant 33 is brought into contact with the moving fingers 64. Since a single finger 64 has much less inertia than the fruit 34, it tends to wrap itself around the fruit 34, as shown in FIG. 5, and then to separate the fruit 34 from the vine 33 (FIG. 6) by the twisting and inertial action which take place as the finger 64 continues on its way. The twisting force is developed by the friction between the finger 64 and the fruit 34. The vine transport device thus enables the vine 33 to be held in a controlled position with respect to the drums 60 and 61 and to be moved through the separator at a controlled speed. With the vines suspended upside down and moving along between the rotating drums 60 and 61, the action of the drums 60 and 61 and fingers 64 spreads the vine 33 and enables maximum contact between the fingers 64 and the fruit 34. The lengths of the fingers 64 may be determined by experiment, and optimum FIGS. obtained for particular crops. For example, with units having drums 60 and 61 approximately 8 inches in diameter and 2 feet long, the spacing between the drums can be set to a distance somewhat shorter than the finger lengths. Typical finger lengths are about 8 to 12 inches, through other lengths may be used, and the spacing of the drums may therefore be about 6 inches apart from periphery to periphery at the closest point with the fingers overlapping about 2 inches or may be even closer or further.

The fruit 34 thus pulled from the vine 33 may be recovered in flexible bins 65 which may be made from canvas or other resilient material to avoid shock to the fruit. The fruit may be collected in a suitable bin or transferred to a conveyor which automatically moves it into bins or other packing equipment.

Figures 3, 7, 8:
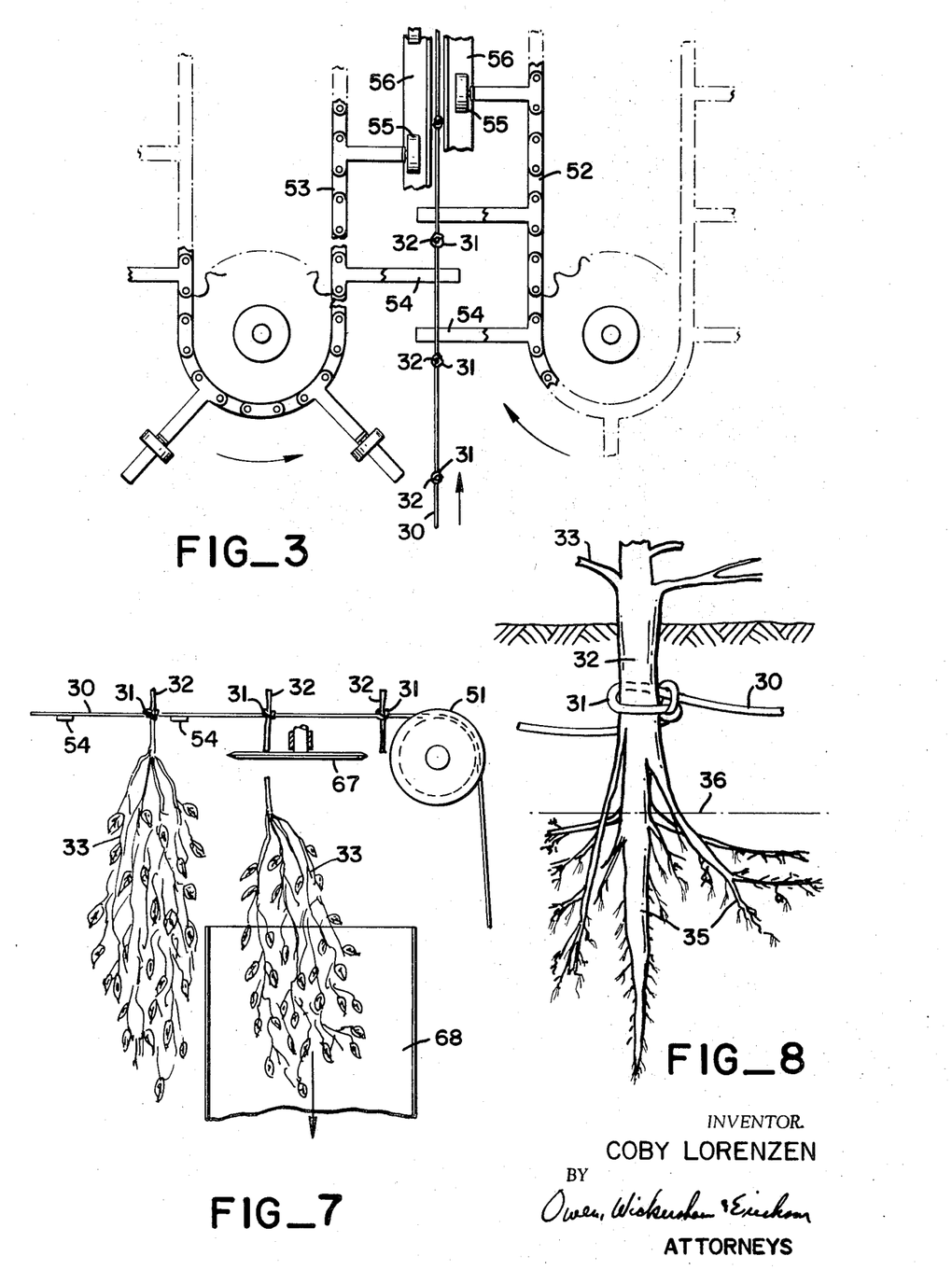
FIG. 3 is an enlarged fragmentary top plan view of a portion of FIG. 2 with some portions broken away to show other parts.
FIG. 7 is a fragmentary view in side elevation taken along the line 7-7 in FIG. 2 showing the cutting of the tomato vine from the stub of the stem after the separation step.
FIG. 8 is a fragmentary view in side elevation and in section showing how the line is tied around the main stem of each tomato plant by a slipknot below ground level. The view also illustrates the location of the cutting level.

After the fruit 34 has been stripped from the vines 33, the vines themselves are preferably cutoff by passing the stem 32 between two rotary disc knives 66 and 67 so that, as shown in FIG. 7, the vines fall down a discharge chute 68 while the line 30 passes over the pulley 51 and is reeled up on a suitable reel 69.

Figure 9:
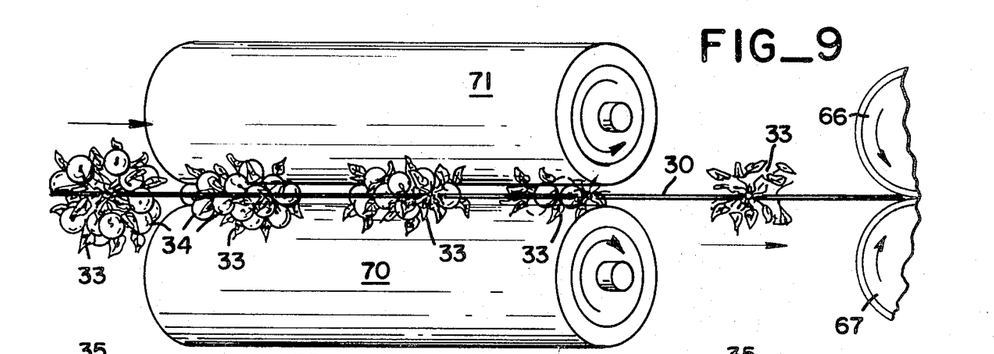
FIG. 9 is a top plan view of another type of separating device embodying two rollers which rotate at different speeds to achieve the twisting action.
Figures 10, 11, 12, 13:
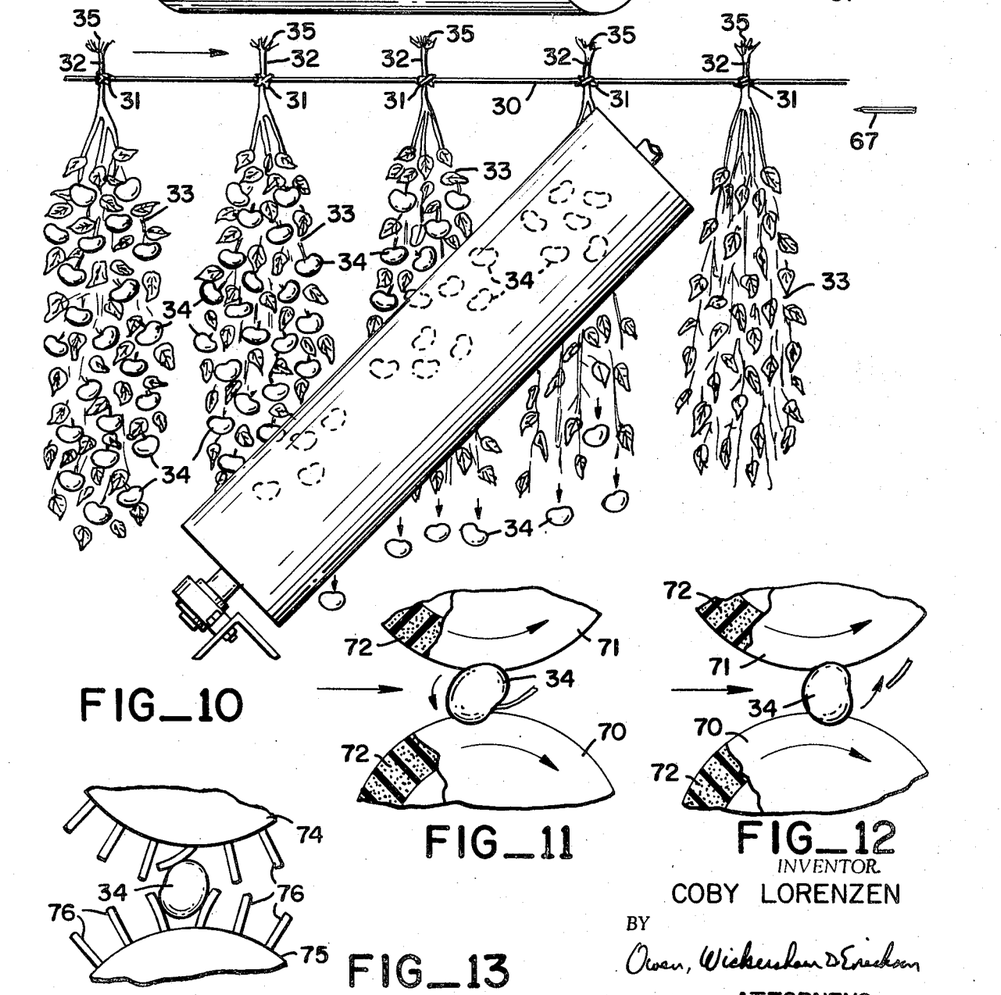
FIG. 10 is a view in side elevation of the separator of FIG. 9.
FIG. 11 is a fragmentary view partly in section illustrating the twisting of a tomato still on its stem by the apparatus of FIGS. 9 and 10.
FIG. 12 is a view similar to FIG. 11 with the tomato twisted off from its stem.
FIG. 13 is a similar view showing a modified form of rollers.

Another type of twisting action is that shown in FIGS. 9 to 12, in which a pair of cylindrical rollers 70 and 71 are provided, preferably tilted at an angle of say 45°, although the angle may be bigger or smaller. Both of these rollers are preferably covered with a thick layer of sponge rubber 72 which yields to prevent damage to the fruit. As the line 30 and the plants 33 are pulled along, (e.g., as in FIG. 1), the fruit 34 is harvested, first at the lowermost end of the vine, then toward the middle, and then toward the upper end, all as shown in FIG. 10. In each instance it is desirable for there to be a twisting action, and this may be obtained by having the two rollers 70 and 71 rotate at different speeds, so that there will naturally be a twisting of the fruit, all of which at some time passes between the two rollers 70 and 71. Therefore, the twisting action takes place and the stem remains with the vine, while the fruit 34 is twisted off and falls out and down into a collecting conveyor or other collection means, not shown in these views. As shown in FIGS. 9 and 10, the fruit is thus progressively harvested through the vine rather than all at once, enabling a more efficient action, leaving a well stripped vine.

As shown in FIG. 13, rollers 74 and 75 with flexible solid rubber fingers 76 may be used with approximately the same results.

Figure 14:
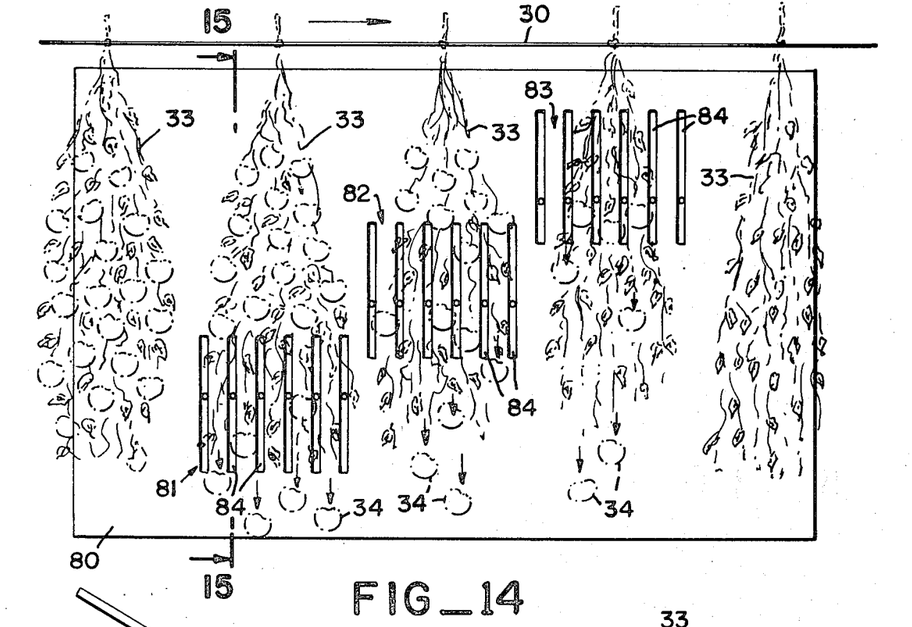
FIG. 14 is a top plan view of another form of separation in which a raking action is employed.
Figures 15, 16, 17:
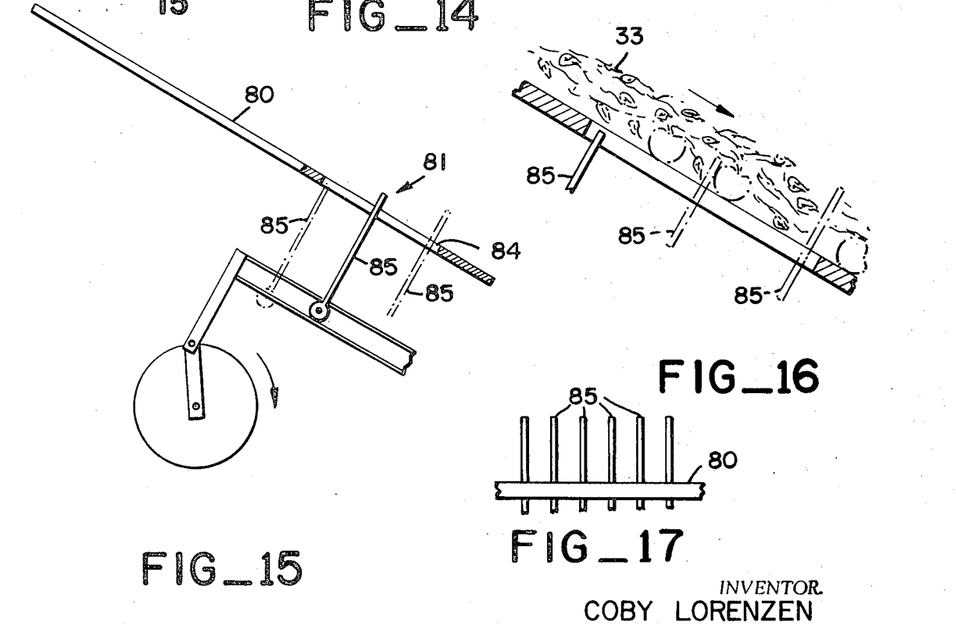
FIG. 15 is an enlarged view in section taken along the line 15-15 in FIG. 14 illustrating the raking action.
FIG. 16 is a further enlarged view of a portion of the rake illustrating how it pulls tomatoes from their stems.
FIG. 17 is a view in end elevation of the same.

FIGS. 14 to 16 show another form of harvesting in which the vines 33 are again carried along inverted and suspended from the line 30 but are in this instance swept over an inclined table 80 having a set of rakes, such as the three rakes 81, 82, 83 shown in FIG. 14, which progressively act on separate parts of the vine. These rakes 81, 82, 83 may each comprise a guard 84 and tines 85 operated in a square type of movement so that they move upwardly into the vine 33, then move along in a direction contrary to the movement of the vine, so as to pull fruit 34 off by a pulling action and then drop down and let the vine pass on. The teeth or tines 85 may be covered with elastomer or soft material to prevent their breaking the vines.

The action of the combs or rakes 81, 82, 83 differs from the action of the rollers and strips of FIGS. 1—18, in that their pulling action plucks the tomato from the vine instead of twisting it off from the stem.

Figures 18, 19, 20, 21, 22, 23, 24:
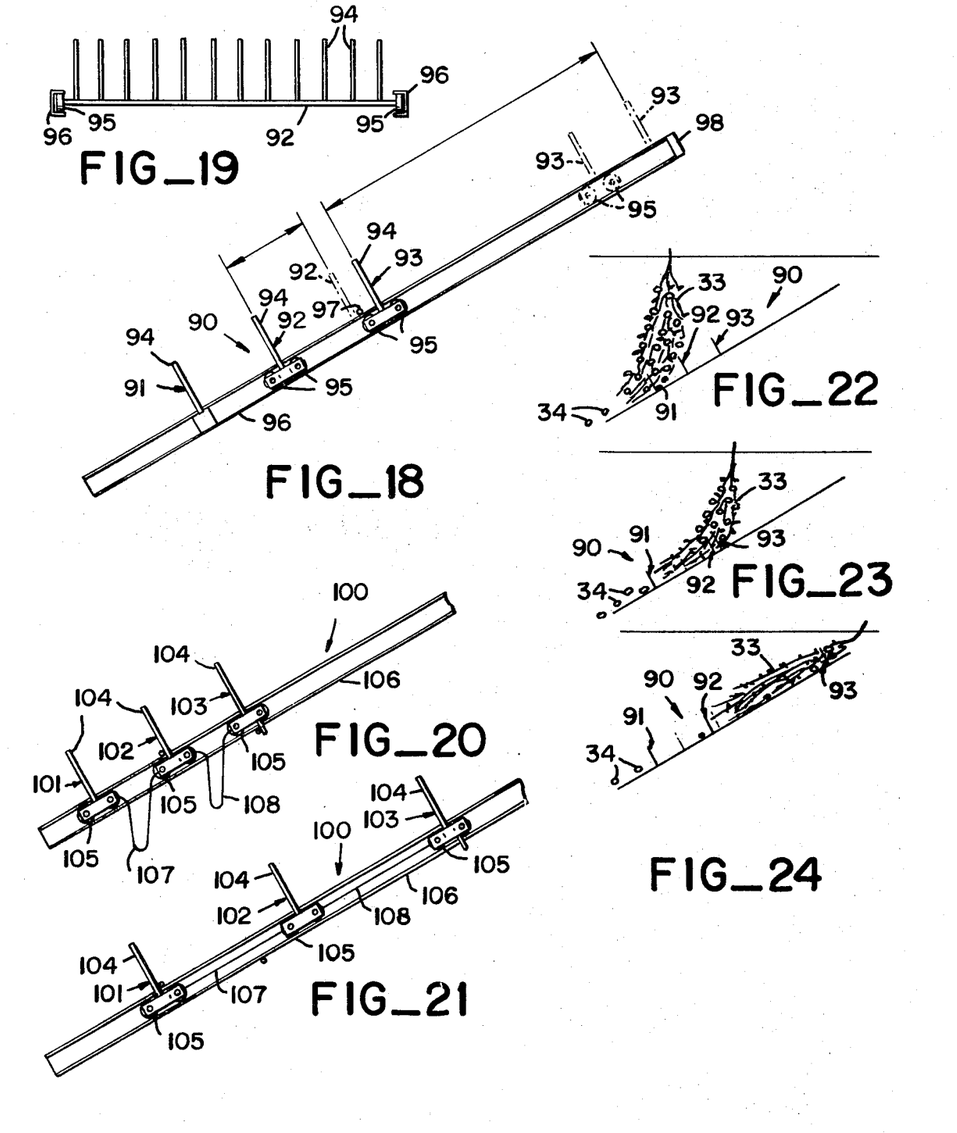
FIG. 18 is a view in side elevation of another form of raking apparatus.
FIG. 19 is a view in end elevation of the raking apparatus of FIG. 18.
FIG. 20 is a view of another modified form of raking apparatus in its beginning position.
FIG. 21 is a similar view of the apparatus of FIG. 20 showing the rakes in their fully extended position.
FIG. 22 is a diagrammatic view illustrating the effect of the rakes of FIGS. 18—21 upon the tomatoes, showing the initial position of a vine engaging the rake, the rake being in its FIG. 20 position.
FIG. 23 is a similar view with the rake in the position like that of FIG. 18.
FIG. 24 is a similar view with the rake in the position of FIG. 21.
Figure 25:
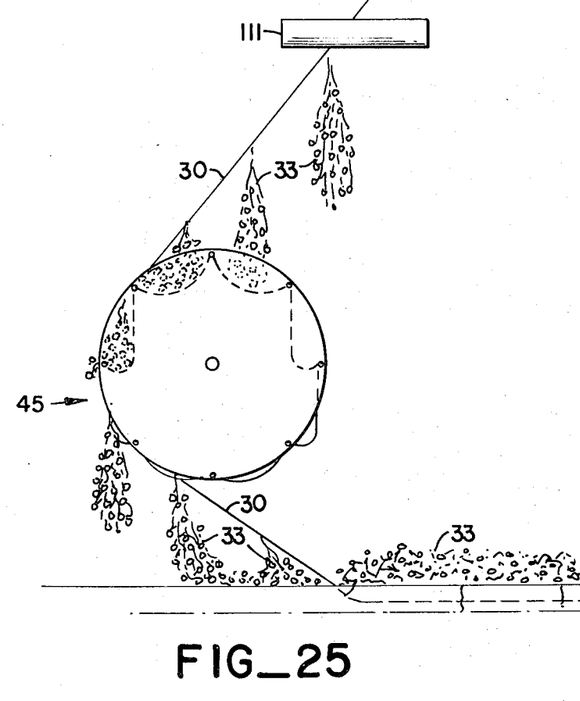
FIG. 25 is a somewhat diagrammatic view in side elevation of another modified form of the harvester of the invention.

Another kind of raking action with lost motion is shown in the separator 90 of FIGS. 18 and 19 in which a set of three rakes 91, 92, and 93 are illustrated. Their tines 94 always are projected, and, as shown in FIGS. 18 and 19, the lowest rake 91 may be stationary and its tines 94 engage a lower part of the vine 33, the movement of the vine 33 thereacross removing the fruit 34 from the lowest portion of the vine. The rakes 92 and 93 are movable, being mounted on rollers 95 that move along in channels 96. At first these rakes 92 and 93 move out with the vine 33, and then the rake 92 engages a stop 97 and stops while the vine 33 continues to move, plucking off the fruit 34 from the center of the vine and engaged by the now stationary rake 92, while the rake 93 continues to move. Finally, the rake 93 is stopped by a stop 98 and rakes the fruit 34 from the top portion of the vine 33. The action is that of FIGS. 22 to 24.

A basically similar action is accomplished in a somewhat modified form by the apparatus 100 of FIGS. 20 and 21, wherein there are three rakes 101, 102, and 103 with tines 104 and wheels 105 movable in a channel 106. The three are connected together by cords 107 and 108 which at first are slack (FIG. 20) and then are pulled apart by the vine 33 until the cords 107 and 108 are taut (FIG. 21) and thence rake the vine, one at a time as shown in FIGS. 22—24.

An example of the application of vibration or oscillation to the separation system is illustrated in FIGS. 25 through 30.

Figure 26:
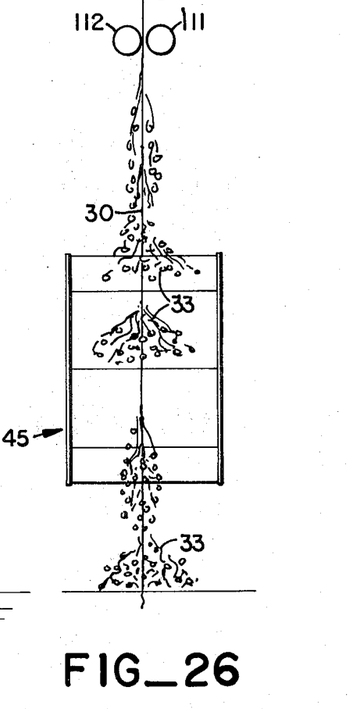
FIG. 26 is a view in end elevation of the device of FIG. 25.
Figure 27:
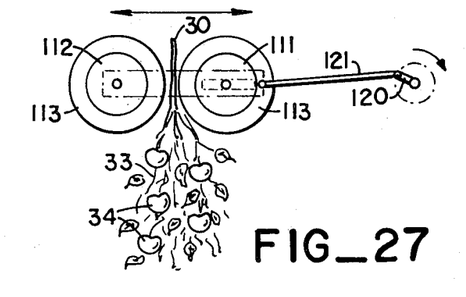
FIG. 27 is an enlarged view of a portion of FIG. 2, showing how vibration is imparted.
Figure 28:
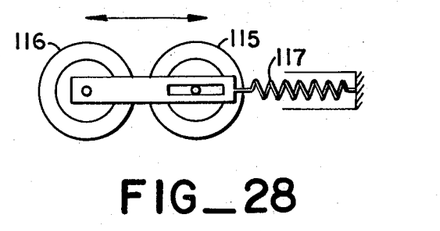
FIG. 28 is a view of a modified form of roller set, where spring loaded rollers are used.

When the vines 33 are lifted by the line 30 (FIG. 25) the drum 45 performs a function similar to that associated with the stripper system of FIG. 1. The line 30 is then continued upward and forward at a convenient angle which depends upon the particular machine element design. The line 30 is directed between two rollers 111 and 112 that are horizontally disposed with their axes parallel and are spaced so that the vine 33 is moved between them with little or no free lateral motion (FIG. 26). The rollers 111 and 112 may be covered with a flexible layer 113 of rubber or other material (FIG. 27), or spring loaded rollers 115, 116 with spring 117 (FIG. 28) may be used to provide flexibility. The rolls 111 and 112 are mounted so as to be oscillated by an eccentric crank 120 and rod 121 laterally as shown in FIG. 27.

Figures 29, 30:
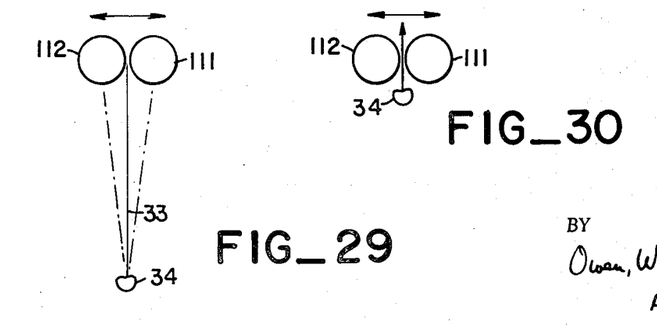
FIG. 29 is a diagrammatic view showing how the shaking force is very mild on a distant tomato.
FIG. 30 is a view like FIG. 29, wherein the tomato close to the shaking rollers is given more vigorous shaking.

The separation function is as follows: FIG. 29 shows the rollers 111 and 112 with their periodic lateral displacement and a tomato 34 suspended on the vine 33 at a distance below the rolls 111 and 112. Under this condition, the flexibility of the vine 33 results in little or no fatigue at the point of attachment of the vine 33 to the fruit 34. As the vine 33 is drawn up between the rollers 111 and 112, the effective length of the vine stem grows shorter and therefore stiffer, as shown in FIG. 30, and the inertia of the fruit 34 enables the vine 33 to be separated from the fruit 34 by fatigue at the point of attachment.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A production method for row crops comprising the steps of:
   placing below ground a line having a series of spaced-apart slipknots;
   growing plants in a row so that the stems extend through said slipknots and branch above them, with the roots branching below the knot, until the fruit on the plants is ready for harvest, then severing the roots below said slipknots;
   pulling said line from the ground so as to tighten each said slipknot and carry up the plants with the line;
   orienting the plants by means of the pulled-up line;
   exerting a force on the fruit tending toward and resulting in separation of the fruit from the plants; and
   collecting the separated fruit while disposing of the plants.

2. The method of claim 1 wherein said exerting step comprises twisting the fruit from the stems.

3. The method of claim 1 wherein said exerting step comprises plucking the fruit from the stems.

4. The method of claim 1 wherein said exerting step comprises shaking the fruit from the stems.

5. The method of claim 1 wherein said severing step is carried out immediately before said pulling step.

6. The method of claim 1 wherein said severing step is carried out prior to harvest and a set time elapses before said pulling step.

7. The method of claim 1 wherein said placing step is done simultaneously with the planting of a seed within each slipknot, so that the growing step is accomplished without further placement of the plant relative to said line.

8. The method of claim 1 wherein said severing is done just below where the roots branch from the main stem.

9. A harvesting method for row crops grown in conjunction with a line having a series of spaced-apart slipknots, with the plant stems extending through said slipknots and the roots branching below the knot, comprising the steps of:
   severing the roots below said slipknots;
   pulling said line from the ground so as to tighten each said slipknot and carry up the plants with the line;
   orienting the plants by means of the pulled-up line;
   stripping the fruit from the plants; and
   collecting the stripped fruit together while disposing of the plants.

10. The method of claim 9 wherein said exerting step comprises twisting the fruit from the stems.

11. The method of claim 9 wherein said exerting step comprises plucking the fruit from the stems.

12. The method of claim 9 wherein said severing step is carried out immediately before said pulling step.

13. The method of claim 9 wherein said severing step is carried out prior to harvest and a set time elapses before said pulling step.

14. The method of claim 9 wherein said severing is done just below where the roots branch from the main stem.

15. A row crop harvester for plants grown in conjunction with a line having a series of spaced-apart slipknots, the stems of the plants extending through said slipknots with the roots branching below the knot, comprising:
   means for severing the roots below said slipknots;
   means for pulling said line from the ground so as to tighten each said slipknot and carry up the plants with the line;
   means for orienting the plants by means of the pulled-up line;
   means for stripping the fruit from the plants; and
   means for collecting the stripped fruit together while disposing of the plants.

16. The harvester of claim 15 wherein said means for stripping comprises means for twisting said fruit relative to the stems on which they grow.

17. The harvester of claim 16 wherein said means for twisting comprises a pair of parallel drums having a plurality of straps thereon overlapping when extended out full length, the drums lying on opposite sides of the plant.

18. The harvester of claim 16 wherein said means for twisting comprises a pair of rollers having yieldable outer contact portions on opposite sides of the plant, between which the plant passes, and means for rotating said drums at different speeds.

19. The harvester of claim 18 wherein said yieldable outer contact portions comprise foam rubber cushions.

20. The harvester of claim 18 wherein said yieldable outer contact portions comprise flexible fingers.

21. The harvester of claim 18 wherein there are a plurality of pairs of said rollers set successively at different heights along the path of the plant to strip different areas at different times, successively.

22. The harvester of claim 15 wherein the means for stripping comprises means for plucking the fruit from its stems.

23. The harvester of claim 22 wherein said means for plucking comprises raking means.

24. The harvester of claim 23 wherein said raking means comprises a plurality of rakes acting successively in said plant.

25. The harvester of claim 24 wherein each of said rakes covers a portion only of the plant and each strips a different portion.

26. The harvester of claim 15 wherein the means for stripping comprises means for shaking the fruit from its stems.

27. The harvester of claim 26 wherein said means for shaking comprises two rollers between which the line and plant pass and means for oscillating the rollers transversely of their axes while moving the plant upwardly, so that the fatigue force on the attachment of the fruit to the plant is increased as the fruit approaches closer to the rollers.